No. 883,361. PATENTED MAR. 31, 1908.
S. F. STOLTZFUS.
PLANT CUTTER.
APPLICATION FILED AUG. 24, 1907.
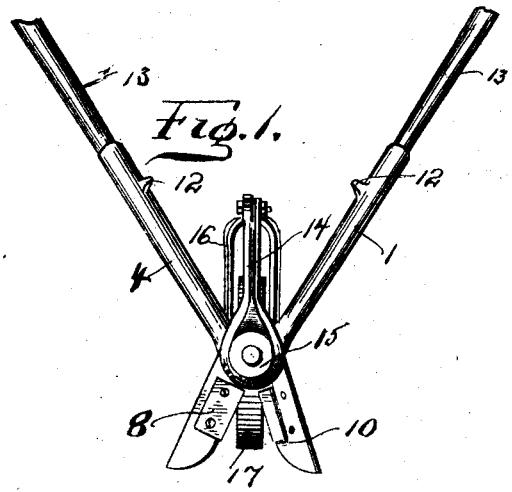
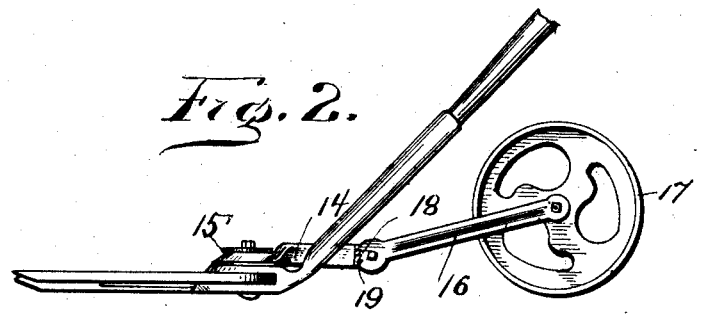
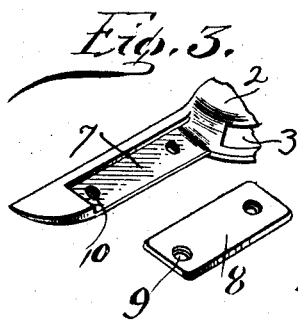
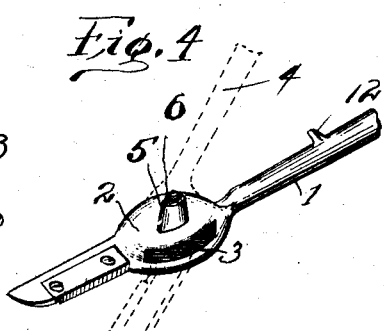
Witnesses
Wilfred E. Lawson
Harry F. Rueth
Inventor
Stephen F. Stoltzfus,
J. Frank Appleman,
asso. Attorney.

UNITED STATES PATENT OFFICE.

STEPHEN F. STOLTZFUS, OF LEOLA, PENNSYLVANIA.

PLANT-CUTTER.

No. 883,361.   Specification of Letters Patent.   Patented March 31, 1908.

Application filed August 24, 1907. Serial No. 390,000.

*To all whom it may concern:*

Be it known that I, STEPHEN F. STOLTZFUS, a citizen of the United States, residing at Leola, in the county of Lancaster and State of Pennsylvania, have invented certain new and useful Improvements in Plant-Cutters, of which the following is a specification.

This invention relates to new and useful improvements in plant cutters and the object of the invention is to provide a novel device of this character for cutting tobacco plants, trimming lawns around flower beds, side-walks, fences or other places where the lawn mower will not reach.

It is a further object of the invention to provide a novel device of this character which will operate in a manner similar to shears, it being also an object of the invention to provide a novel device of this character whereby the cutting blades may be readily removed.

It is also an object of the invention to provide a novel device whereby the cutting blades may be moved to various positions without materially changing the position of the supporting mechanism.

Finally, an object of this invention is to produce a device of the character noted, which will possess advantages in points of simplicity, efficiency and durability, proving at the same time comparatively inexpensive to manufacture.

With the foregoing and the other objects in view, the invention consists in the details of construction and in the arrangement and combination of parts to be hereinafter more fully set forth and claimed.

In describing the invention in detail, reference will be had to the accompanying drawings forming part of this specification whereof in like characters denote corresponding parts in the several views, in which—

Figure 1, is a view in top plan of the device with the supporting mechanism in an inoperative position; Fig. 2, is a view in side elevation showing the device in operative position; Figs. 3 and 4, are perspective views of certain details of the invention; and Figs. 5 and 6, are fragmentary views, illustrating further details.

In the drawings 1, denotes a lever having formed adjacent its lower end, the enlargement 2, having the transverse opening 3, through which passes the lower portion of a lever 4. This enlargement 2, is provided with the boss 5, through which passes the pivot bolt 6, which holds the levers 1 and 4, in operative connection.

The lower ends of the levers 1 and 4, are provided with the sockets 7, adapted to receive the cutting blades 8. The blades are held in their operative position by any suitable securing means passing through the openings 9 and 10, in each of the cutting blades and levers respectively. One of the blades is carried on the upper surface of one of the levers, while the second blade is carried by the under surface of the second lever, and in order that the cutting effect of the blades 8, may be enhanced, the lever 4, which has the cutting blade on the under surface is recessed as at 11. By this arrangement, it will be seen that the cutting blades may be readily removed and replaced in order that an efficient trimmer may be had at all times. The levers 1 and 4 are provided with the opposed lugs 12, which are adapted to contact when the blades are closed and are intended to limit the closing movement of the blades or the levers, in order that the cutting edges of the blades may be protected as will, it is thought, be fully understood. The upper ends of the levers 1 and 4, are socket-like and have fitting therein the operating handles 13, which may be of any length as may be necessitated by the requirements of practice.

Rotatably engaging the boss 5, is an arm 14, which is held against displacement by an enlarged washer 15, which is held in position by the bolt 6, and its intimate parts. This arm 14, extends rearwardly with relation to the cutting blades and has pivotally mounted at its free end, the fork 16. This fork carries the supporting wheel 17. The connecting end of the fork is provided with the ratchet-segment 18, which is engaged by a tooth 19 on the arm 14. By this arrangement the angle of the fork 16, with relation to the arm 14, may be readily adjusted as may be required in operation. It is to be understood that in order to effect this adjustment it will be necessary to move the sections 14 and 16, laterally, one with relation to the other, in order that the tooth 19, may be disengaged from the segment 18.

By having the cutting levers held in pivotal relation with the arm 14, it will be readily understood that the cutting blades may be easily turned without the necessity of materially changing the position of the supporting wheel 17. This is of great advantage as has been fully demonstrated in practice and will, it is thought, be appreciated by those familiar with this class of invention.

What I claim is:

In a device of the character described, a wheeled carrier, a lever, an enlargement carried by the lever, said enlargement being provided with a transverse opening, a boss projecting from the enlargement of the lever, a second lever passing through the transverse opening of the enlargement of the first named lever, a bolt pivotally connecting the first and second levers, said bolt passing through the boss of the enlargement, said boss being pivotally engaged by the wheeled carrier, and means for engaging the bolt for holding the wheeled carrier against displacement from the boss, and cutting blades removably carried by the levers.

In testimony whereof I affix my signature in presence of two witnesses.

STEPHEN F. STOLTZFUS.

Witnesses:
 ADAM DELLET,
 W. J. MINGLE.